United States Patent [19]
Vukovic

[11] Patent Number: 5,860,864
[45] Date of Patent: Jan. 19, 1999

[54] JOINT ASSEMBLY HAVING SELF-BIASING MECHANISM TO BIAS TWO SHAFTS INTO COAXIAL ALIGNMENT

[75] Inventor: Ivan Vukovic, Edmonton, Canada

[73] Assignee: Camco International, Inc., Houston, Tex.

[21] Appl. No.: 781,738

[22] Filed: Jan. 10, 1997

[51] Int. Cl.⁶ .................................................. F16D 3/18
[52] U.S. Cl. ........................................ 464/147; 464/156
[58] Field of Search ................................ 464/18, 20, 147, 464/156, 155, 162, 169

[56] References Cited

U.S. PATENT DOCUMENTS

| | | | |
|---|---|---|---|
| 2,375,030 | 5/1945 | O'Malley | 464/155 |
| 2,845,781 | 8/1958 | O'Brien . | |
| 2,906,106 | 9/1959 | Haas | 464/156 |
| 2,914,932 | 12/1959 | Emrick | 464/147 |
| 3,243,973 | 4/1966 | Kraeling | 464/156 |
| 3,299,670 | 1/1967 | Allbeson et al. | 464/156 |
| 3,627,453 | 12/1971 | Clark . | |
| 4,037,430 | 7/1977 | Wright . | |
| 4,068,499 | 1/1978 | Sharp . | |
| 4,080,115 | 3/1978 | Sims et al. . | |
| 4,772,246 | 9/1988 | Wenzel | 464/155 |
| 4,990,121 | 2/1991 | Vosbeck et al. | 464/16 |
| 5,048,622 | 9/1991 | Ide . | |
| 5,267,905 | 12/1993 | Wenzel et al. | 464/155 |
| 5,421,780 | 6/1995 | Vukovic . | |
| 5,425,676 | 6/1995 | Cornay | 464/11 |

FOREIGN PATENT DOCUMENTS

| | | |
|---|---|---|
| 924181 | 4/1973 | Canada . |
| 324168 | 7/1989 | European Pat. Off. . |
| 914232 | 10/1946 | France ................................. 464/156 |
| 1196131 | 11/1959 | France . |
| 2331712 | 6/1977 | France . |
| 2610682 | 8/1988 | France . |
| 1155747 | 10/1963 | Germany . |
| 3000477 | 7/1981 | Germany . |
| 326210 | 6/1936 | Italy ...................................... 464/156 |
| 2040397 | 8/1980 | United Kingdom .................. 464/156 |
| 9429604 | 12/1994 | WIPO . |

*Primary Examiner*—Eileen Dunn Lillis

[57] ABSTRACT

A joint assembly for connecting two spaced drive shafts, such as in a submergible pumping system. The joint assembly comprises a connecting shaft having enlarged bodies on each end thereof, a housing surrounding each enlarged body, each housing connectable to one of the drive shafts, lock devices for preventing relative rotational movement of the connecting shaft with respect to the drive shafts, and mechanisms within each housing acting upon the enlarged bodies to bias the connecting shaft into coaxial alignment with the drive shafts. With this joint assembly lateral displacement or "wobble" of the drive shafts is permitted, yet the bias mechanisms tend to restore the drive shafts to coaxial alignment.

21 Claims, 3 Drawing Sheets

JOINT ASSEMBLY HAVING SELF-BIASING MECHANISM TO BIAS TWO SHAFTS INTO COAXIAL ALIGNMENT

BACKGROUND OF THE INVENTION

1. Field of the Invention.

The present invention relates to a joint assemblies for use in drive trains and, more particularly, to drive trains within downhole rotational tools.

2. Description of Related Art.

Subterranean fluids, such as oil, gas and water, are often pumped or "lifted" from well bores by the operation of downhole pumps, such as by electric submergible pumping systems (SPSs). SPSs typically use an elongated electric motor installed within the wellborn to rotate a multistage centrifugal pump. While centrifugal pumps are widely used for the recovery of subterranean fluids, such centrifugal pumps have difficulty in lifting viscous fluids, such as from Southern California, and fluids with relatively high concentrations of sand and other abrasive materials, such as from the tar sands area of Alberta, Canada. Thus, there is a need for a downhole pump that can lift such fluids.

Canadian Patent 924,181 discloses a solution to the problem using an ESP to recover viscous fluids and fluids with relatively high concentrations of sand with an ESP, and the solution consists of connecting a Moineau pump or a progressive cavity pump (PCP) though a gear reduction system to an SPS's electric motor. Progressive cavity pumps have been proven efficient in recovering relatively viscous fluids and fluids with relatively high concentrations of sand. Examples of progressive cavity pumps are disclosed in U.S. Pat. No. 3,627,453; 4,080,115; and 5,048,622. One major hindrance to the successful operation of such a pumping system has been that the progressive cavity pump inherently causes oscillations and gyrations that propagate through the pumping system's drive train. These oscillations and gyrations are hereinafter referred to as "non-coaxial" forces, and have been found to be of sufficient magnitude to damage the bearings in the SPS's electric motor and thus cause the SPS to prematurely fail. The failed SPS must then be removed from the wellbore, which causes the operator to suffer loss of production, loss of revenue and additional repair costs.

The non-coaxial forces are caused by the rotor in the progressive cavity pump being in the shape of a helix contained within a cavity or a flexible lining within a housing, referred to as the stator. The rotor rolls with respect to the stator so that the rotor and stator form a series of sealed cavities which are approximately 180 degrees apart. As one cavity increases in volume, its counterpart cavity decreases in volume, at exactly the same rate. The driving motion of the rotor is quite complex in that it is simultaneously rotating and moving transversely with respect to the stationary stator's liner. The rotation of the true center of the rotor traces a circle progressing the opposite direction to the rotation of the rotor, but with the same speed. Thus, the rotor driving motion is simultaneously a rotation, an oscillation, and a reverse orbit. It is a combination of these motions acting at the point of interconnection of the rotor to the electric motor that cause the undesired non-coaxial forces to be destructively transmitted to the bearings in the SPS's electric motor.

U.S. Pat. No. 5,408,622 discloses a dual universal joint mechanism for interconnecting a progressive cavity motor with a drill bit. The dual universal joint mechanism disclosed in U.S. Pat. No. '622 tries to solve the same problem of non-coaxial forces as above described by permitting limited non-parallel axial deflection or "buckling" of the drive train in response to such forces about two conventional dual-yoked universal joints. However, it has been found that this "buckling" causes the overall length of the assembly to be reduced thereby requiring an additional slip joint connector. Further, once the universal joint has been deflected or "buckled out of parallel axial alignment", and compression forces are added, there is no way for the universal joint to un-buckle and be realigned so that it can move in response to noncoaxial forces.

One solution to the above described problem is a joint assembly that permits limited lateral displacement and is described in U.S. Pat. No. 5,421,780. While this joint assembly has proven to be an excellent solution, there is a need for a joint assembly that can transverse a greater gap or distance between ends of the drive shafts, and at the same time efficiently and reliably reduce or eliminate such non-coaxial forces so that a progressive cavity pump can be successfully connected to and used with an ESP's electric motor.

SUMMARY OF THE INVENTION

The present invention has been contemplated to overcome the foregoing deficiencies and meet the above described needs. Specifically, the present invention is a joint assembly for interconnection into a drive train of a downhole rotary tool, such as an ESP. The joint assembly permits limited lateral displacement to reduce or eliminate non-coaxial forces that heretofore have damaged the bearings in the ESP's electric motor. The joint assembly comprises a connecting shaft having enlarged bodies on each end thereof, a housing surrounding each enlarged body, each housing connectable to one of the drive shafts, lock devices for preventing relative rotational movement of the connecting shaft with respect to the drive shafts, and mechanisms within each housing acting upon the enlarged bodies to bias the connecting shaft into coaxial alignment with the drive shafts. With this joint assembly, lateral displacement or "wobble" of the drive shafts is permitted, yet the bias mechanisms tend to restore the drive shafts to coaxial alignment under compression or tension.

DETAILED DESCRIPTION OF THE PREFERRED EMBODIMENTS

Figure 1:
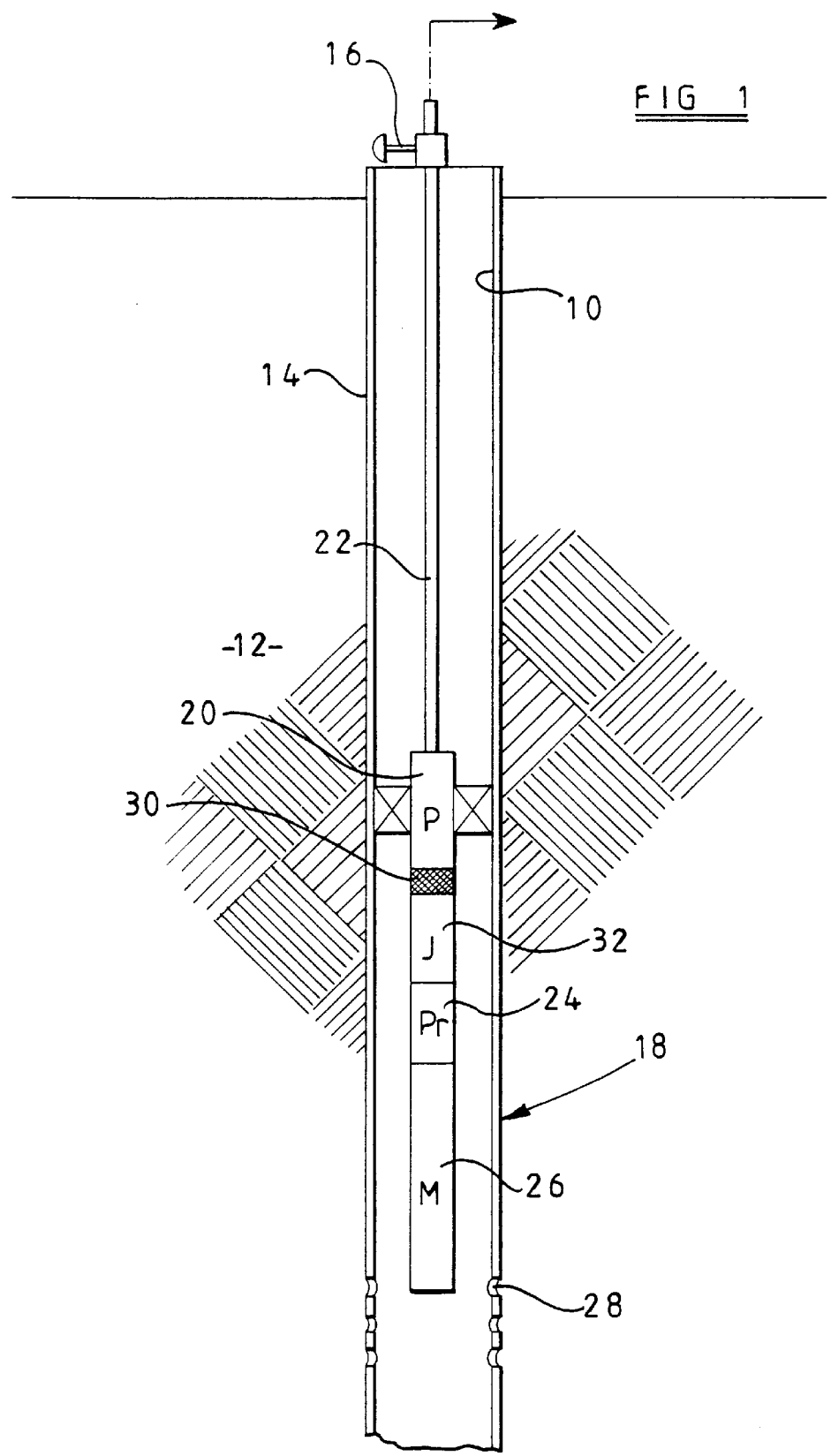
FIG. 1 is an elevational view of a pump connected to an SPS' s electric motor in accordance with one preferred embodiment of a joint assembly of the present invention, and with such pump and electric motor suspended within a wellbore.

To aid in the understanding of the present invention, reference is made to the accompanying drawings. FIG. 1 illustrates a well 10 adapted to recover subterranean fluids, such as oil, gas and/or water, from one or more subterranean earthen formations 12. The well 10 includes a tubing or casing string 14 which is connected at the earth's surface to a production tree 16, which includes appropriate valving and piping, as is well known to those skilled in the art. Suspended within the well 10 is an electric submergible pumping system (SPS), generally indicated by reference number 18. The SPS 18, for the purposes of the present discussion, comprises a Moineau pump or a progressive cavity pump 20 connected at an upper portion thereof to a production tubing 22 for the transport of the subterranean fluids to the earth's surface. Connected to a lower end of the pump 20 is an SPS's electric motor protector 24 and connected below the motor protector 24 is an SPS' s electric motor 26. As is well known to those skilled in the art, fluids from the subterranean formations 12 enter through openings or perforations 28 in the casing 14, and the fluids are transported upwardly past the exterior of the electric motor 26 and the motor protector 24 to enter one or more openings 30 in a lower portion of the pump 20. Once the fluids enter the opening(s) 30, the fluids are transported upwardly through the pump 20 by the rotation of the helix-shaped rotor (not shown), about the corresponding helix-shaped stationary stator (not shown) and the fluids are then transported upwardly through the piping 22 to the earth's surface.

As has been described above, the joint assembly of the present invention is intended for use as an interconnection between a rotor of the pump 20 and a drive shaft either of the motor protector 24 or of the electric motor 26. It should be understood that the joint assembly of the present invention can also be used to interconnect the rotor of the pump 20 to a planetary gear reduction system (not shown), as disclosed in Canadian Patent 924,181. Further, the joint assembly can be used to interconnect the rotor of a progressive cavity motor to a drill bit, as disclosed in U.S. Pat. No. 5,408,622, or to any other component within a downhole rotary tool as desired. The joint assembly of the present invention can be used in other industrial drive train applications, such as within motor vehicles, power plants, air compressors, milling machinery, and the like.

Figure 2:
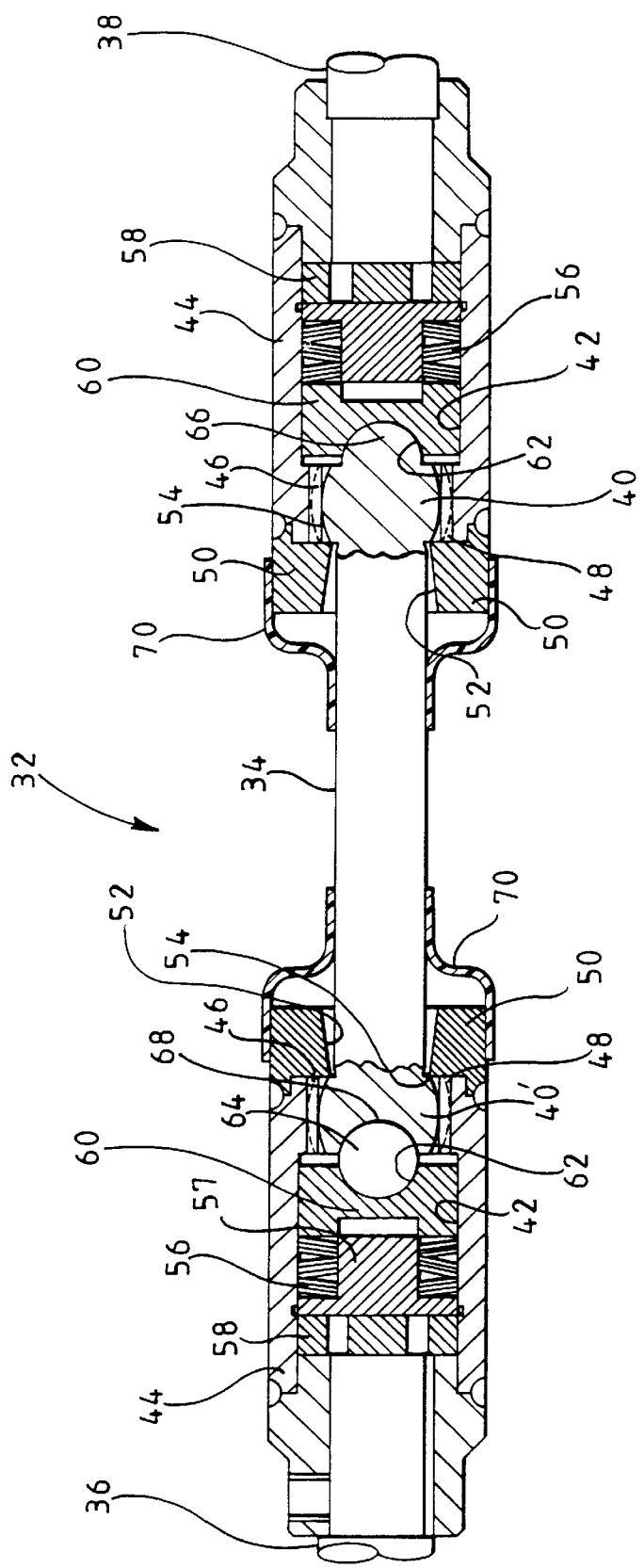
FIG. 2 is a side elevational, partial cutaway view of one preferred embodiment of a joint assembly of the present invention.

One preferred embodiment of the joint assembly of the present invention is shown in FIG. 2 and is generally indicated by reference number 32. The joint assembly 32 comprises a connecting shaft 34 that is connected (as will described in detail below) between a drive shaft 36 that extends from the pump 20 and a drive shaft 38 that extends from the protector 24, and which is rotatably driven by the electric motor 26. Each end of the connecting shaft 34 includes an enlarged body 40', which is generally in the form of a sphere or barrel with curved lateral sides. The enlarged bodies 40' can be integrally formed as part of the connecting shaft 34 or they may be separately formed and attached thereto by way of bolts or welding.

Each enlarged body 40 and 40' is received into a longitudinal opening or bore 42 in a generally tubular housing 44. Each housing 44 is rigidly connected to an end of the drive shafts 36 and 38 by means of keyways, set screws, bolts, or welding. A plurality of longitudinal splines 46 extend from the curved lateral sides of the enlarged bodies 40 and 40', and these splines 46 are intermeshed with a plurality of longitudinal splines or grooves 48 formed within the interior surface of the housing 44. The interaction of the splines 46 and grooves 48, as well as the curved sides of the enlarged bodies 40 permit a limited amount of lateral displacement or "wobble" of the ends of the connecting shaft 34 relative to the housings 44, yet the connecting shaft 34 is prevented from relative rotational movement with respect to the drive shafts 36 and 38. In this manner, rotational movement and torque can be transmitted from the motor 26, through the drive shaft 38 and the connecting shaft 34, to the pump's drive shaft 36 with a limited amount of lateral displacement.

To prevent the enlarged bodies 40 from being pulled from the bores 42 of the housings 44, an end cap 50 is connected across the mouth of the bores 42. The end caps 50 are connected to the ends of the housings 44 by means of threads, set screws, bolts, or welds. Each end cap 50 has a beveled opening 52 through which the connecting shaft 34 extends; the smaller diameter end of the opening 52, defined by an inner edge 54 of the end cap 50, has a diameter less than the outside diameter or the greatest lateral extent of the enlarged body 40. In this manner the enlarged body 40 is retained within the housing 44, yet the beveled opening 52 permits limited lateral displacement of the connecting shaft 34 from the longitudinal axis of the housing 44.

Figure 3:
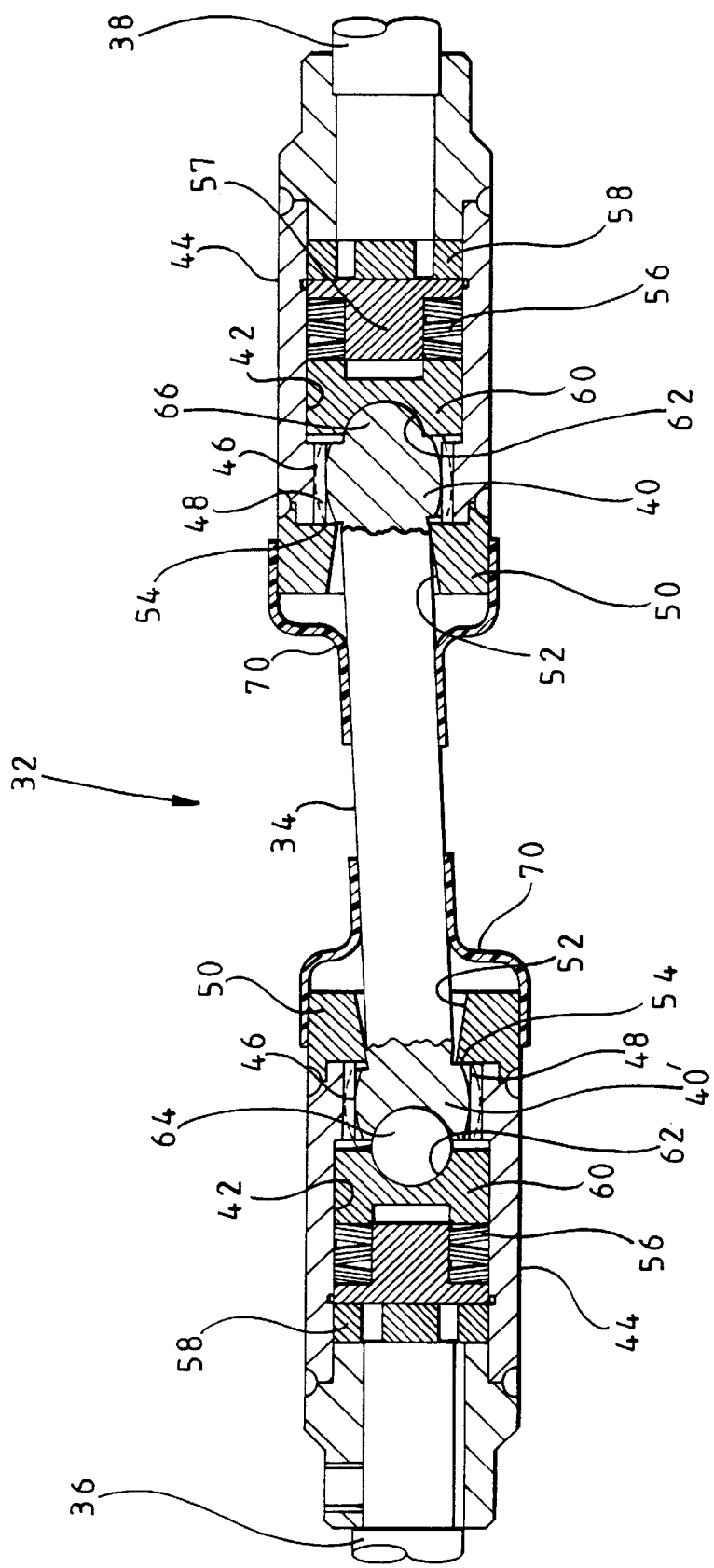
FIG. 3 is a view similar to FIG. 2 with the drive shafts shown being laterally displaced.

One of the benefits of the joint assembly of the present invention is that if the connecting shaft 34 is laterally displaced, such as when the pump's drive shaft 36 begins to "wobble", means are provided to bias the connecting shaft 34 and both housings 44 back into coaxial alignment. This biasing action is provided by one or more springs, preferably a plurality of Belleville washers 56, that are disposed within the bore 42 of each housing 44, and abut against an adjustable gland nut 58 threadedly connected to the end of the drive shafts 36 and 38. When under compression, the springs 56 act upon a back face of a plug or piston 60 that is adapted for limited reciprocal movement within the bore 42. A front face of the piston 60 includes a concave surface 62 that is in contact with a ball 64 (as shown on the left side of FIG. 2) or a hemispherical extension 66 (as shown on the right side of FIG. 2) formed on or connected to an end of the enlarged bodies 40' and 40, respectively. In embodiments where the ball 64 is used, the ball 64 is in contact with a corresponding concave surface 68 formed on an end of the enlarged body 40'. The joint assembly 32 can include bias means that comprise using the balls 64 at each end, the hemispherical extensions 66 at each end, or both as shown in FIGS. 2 and 3.

The bias means described above tends to restore the shafts 36 and 38 back into coaxial alignment with the connecting shaft 34 either under compression or tension as follows. For example, when the pump's drive shafts 36 and 38 are under compression and the pump's shaft 36 begins to move laterally, the housing 40 connected thereto will also be moved out of axial alignment with the other housing 40 and the drive shaft 38, as shown in FIG. 3. The pivoting of the connecting shaft 34 causes the concave surface 62 on the enlarged body 40 to pivot against the ball 64 and thereby forces the ball 64 against and moves the piston 60, as well as further compresses the springs 56. The ball 64 being under compression will be moved back to the "bottom" center of the concave surface 62 of the piston 60, thereby tending to restore the connecting shaft 34 and the housing 40 and the drive shaft 36 and/or 38 all back into coaxial alignment. As can be understood by those skilled in the art, the same principle applies to the use of the hemispherical extension 66 in place of the ball 64.

When the drive shafts 36 and 38 are under tension, the bias means works in basically the same manner as described above, except that when the enlarged body 40' is pivoted the outer edges of the splines 46 and/or an outer lip (not shown) on the enlarged body 40' will come into contact with the immovable inner edge 54 of the end cap 50. This pivoting action will thereby force the concave surface 62 against and move the piston 60, as well as further compress the springs 56. As described above, the interaction of the springs 56 and the concave surfaces 62 and/or 68 will tend to restore the connecting shaft 34 and the housing 40 and the drive shaft 36 and/or 38 all back into coaxial alignment.

Grease or other suitable lubricants are provided within the bores 42 to maintain freedom of movement of the parts. To aid in keeping the moving parts within the housing 40 free of contaminants elastomeric boots or seals 70 are connected at one end to the connecting shaft 34 and at another end to the housing 40.

As will be understood by those skilled in the art, the present invention provides a relatively simple joint assembly to connect two spaced drive shafts, permit limited lateral misalignment, yet restore the shafts to coaxial alignment to prevent pump/motor bearing failures when the shafts are under either compression or tension.

Whereas the present invention has been described in particular relation to the drawings attached hereto, it should be understood that other and further modifications, apart from those shown or suggested herein, may be made within the scope and spirit of the present invention.

What is claimed is:

1. A joint assembly for connecting two spaced drive shafts, comprising:

a connecting shaft having enlarged bodies on each end thereof;

a housing surrounding each enlarged body each housing connectable to one of the drive shafts;

means for preventing relative rotational movement of the connecting shaft with respect to the drive shafts; and bias means within each housing acting upon the enlarged bodies for biasing the connecting shaft into coaxial alignment with the drive shafts, wherein the bias means comprises a hemispherical extension on an end of the enlarged body contacting a concave surface on an end of a piston adapted for limited reciprocal movement within the housing, and springs within the housing for biasing the piston against the hemispherical extension.

2. A joint assembly of claim 1 wherein the housings are each a tubular member with means on one end thereof for rigid interconnection to the respective drive shaft, and means on an opposite end thereof for retaining the enlarged body therein.

3. A joint assembly of claim 2 wherein the tubular members are rigidly coaxially connected to the drive shafts.

4. A joint assembly of claim 1 wherein the means for preventing relative rotational movement comprises a plurality of splines extending from a lateral surface of the enlarged body and intermeshing with a plurality of recesses formed in an inner surface of the housing.

5. A joint assembly of claim 1 wherein the springs comprise a plurality of Belleville washers.

6. A joint assembly of claim 1 wherein the enlarged bodies have a curved lateral surface.

7. A joint assembly of claim 1 and including a boot seal to encompass and seal a portion of the connecting shaft and one end of the housing adjacent thereto.

8. The joint assembly, as set forth in claim 1 wherein the hemispherical extension comprises a ball.

9. A joint assembly for connecting two spaced drive shafts, comprising:

a connecting shaft having enlarged bodies on each end thereof;

a housing surrounding each enlarged body, each housing connectable to one of the drive shafts;

means for preventing relative rotational movement of the connecting shaft with respect to the drive shafts; and bias means within each housing acting upon the enlarged bodies for biasing the connecting shaft into coaxial alignment with the drive shafts, wherein the bias means comprises a ball received between a first concave surface on an end of the enlarged body and a second concave surface on an end of a piston adapted for limited reciprocal movement within the housing, and springs within the housing for biasing the piston against the ball.

10. A joint assembly for connecting a first drive shaft to a second drive shaft, the joint assembly comprising:

a connecting shaft having a first end and a second end, the first end having a first torque transmitting member and the second end having a second torque transmitting member;

a first housing having a first end and a second end, the first end of the first housing being adapted to couple to the first drive shaft and the second end of the first housing being coupled to the first torque transmitting member of the connecting shaft;

a second housing having a first end and a second end, the first end of the second housing being adapted to couple to the second drive shaft and the second end of the second housing being coupled to the second torque transmitting member of the connecting shaft;

a first biasing mechanism coupled to the first end of the connecting shaft, the first biasing mechanism biasing the connecting shaft into coaxial alignment with the first housing; and a second biasing mechanism coupled to the second end of the connecting shaft, the second biasing mechanism biasing the connecting shaft into coaxial alignment with the second housing, wherein each biasing mechanism comprises:

a piston disposed in the respective housing, the piston adapted for limited reciprocal movement within the respective housing, and the piston having a concave surface;

a curved extension disposed between a concave surface of a respective end of the connecting shaft and the concave surface of the piston; and a spring disposed in the respective housing, the spring adapted for biasing the respective piston against the respective curved extension to bias the connecting shaft into coaxial alignment with the respective housing.

11. The joint assembly, as set forth in claim 10, wherein the curved extension comprises a ball.

12. The joint assembly, as set forth in claims 10, where the curved extension comprises a hemispherical extension.

13. A joint assembly for connecting a first drive shaft to a second drive shaft, the joint assembly comprising:

a connecting shaft having a first end and a second end, the first end having a first torque transmitting member and terminating in a first curved surface, and the second end having a second torque transmitting member and terminating in a second curved surface;

a first housing having a first end and a second end, the first end of the first housing being adapted to couple to the first drive shaft and the second end of the first housing being coupled to the first torque transmitting member of the connecting shaft;

a second housing having a first end and a second end, the first end of the second housing being adapted to couple to the second drive shaft and the second end of the second housing being coupled to the second torque transmitting member of the connecting shaft;

a first spring mechanism coupled to the first curved surface. the first spring mechanism biasing the connecting shaft into coaxial alignment with the first housing; and a second spring mechanism coupled to the second curved surface, the second spring mechanism biasing the connecting shaft into coaxial alignment with the second housing, wherein each spring mechanism comprises:

a piston disposed in the respective housing, the piston adapted for limited reciprocal movement within the respective housing, and the piston having a concave surface;

a curved extension disposed between the respective curved surface of a respective end of the connecting shaft and the concave surface of the piston; and a spring disposed in the respective housing, the spring adapted for biasing the respective piston against the respective curved extension to bias the connecting shaft into coaxial alignment with the respective housing.

14. The joint assembly, as set forth in claim 13, wherein the curved extension comprises a ball.

15. The joint assembly, as set forth in claim 13, wherein the curved extension comprises a hemispherical extension.

16. A submergible pumping system comprising:

a pump having a first drive shaft;

a motor having a second drive shaft; and a joint assembly for coupling the first drive shaft to the second drive shaft, the joint assembly comprising:

a connecting shaft having a first end and a second end, the first end having a first torque transmitting member and the second end having a second torque transmitting member;

a first housing having a first end and a second end, the first end of the first housing being coupled to the first drive shaft and the second end of the first housing being coupled to the first torque transmitting member of the connecting shaft;

a second housing having a first end and a second end, the first end of the second housing being coupled to the second drive shaft and the second end of the second housing being coupled to the second torque transmitting member of the connecting shaft;

a first biasing mechanism coupled to the first end of the connecting shaft, the first biasing mechanism biasing the connecting shaft into coaxial alignment with the first housing; and a second biasing mechanism coupled to the second end of the connecting shaft, the second biasing mechanism biasing the connecting shaft into coaxial alignment with the second housing, wherein each biasing mechanism comprises:

a piston disposed in the respective housing, the piston adapted for limited reciprocal movement within the respective housing, and the piston having a concave surface;

a curved extension disposed between a concave surface of a respective end of the connecting shaft and the concave surface of the piston; and a spring disposed in the respective housing, the spring adapted for biasing the respective piston against the respective curved extension to bias the connecting shaft into coaxial alignment with the respective housing.

17. The joint assembly, as set forth in claim 16, wherein the curved extension comprises a ball.

18. The joint assembly, as set forth in claim 16, wherein the curved extension comprises a hemispherical extension.

19. A submergible pumping system comprising:

a pump having a first drive shaft;

a motor having a second drive shaft; and a joint assembly for coupling the first drive shaft to the second drive shaft, the joint assembly comprising:

a connecting shaft having a first end and a second end, the first end having a first torque transmitting member and terminating in a first curved surface, and the second end having a second torque transmitting member and terminating in a second curved surface;

a first housing having a first end and a second end, the first end of the first housing being adapted to couple to the first drive shaft and the second end of the first housing being coupled to the first torque transmitting member of the connecting shaft;

a second housing having a first end and a second end, the first end of the second housing being adapted to couple to the second drive shaft and the second end of the second housing being coupled to the second torque transmitting member of the connecting shaft;

a first spring mechanism coupled to the first curved surface, the first spring mechanism biasing the connecting shaft into coaxial alignment with the first housing; and a second spring mechanism coupled to the second curved surface, the second spring mechanism biasing the connecting shaft into coaxial alignment with the second housing, wherein each spring mechanism comprises:

a piston disposed in the respective housing, the piston adapted for limited reciprocal movement within the respective housing, and the piston having a concave surface;

a curved extension disposed between the respective curved surface of a respective end of the connecting shaft and the concave surface of the piston; and a spring disposed in the respective housing, the spring adapted for biasing the respective piston against the respective curved extension to bias the connecting shaft into coaxial alignment with the respective housing.

20. The joint assembly, as set forth in claim 19, wherein the curved extension comprises a ball.

21. The joint assembly, as set forth in claim 19, wherein the curved extension comprises a hemispherical extension.

* * * * *